L. A. SUBERS.
MACHINE FOR THE CONTINUOUS VULCANIZATION OF BANDS OR BELTS.
APPLICATION FILED DEC. 13, 1920.
1,391,805.
Patented Sept. 27, 1921.
2 SHEETS—SHEET 1.
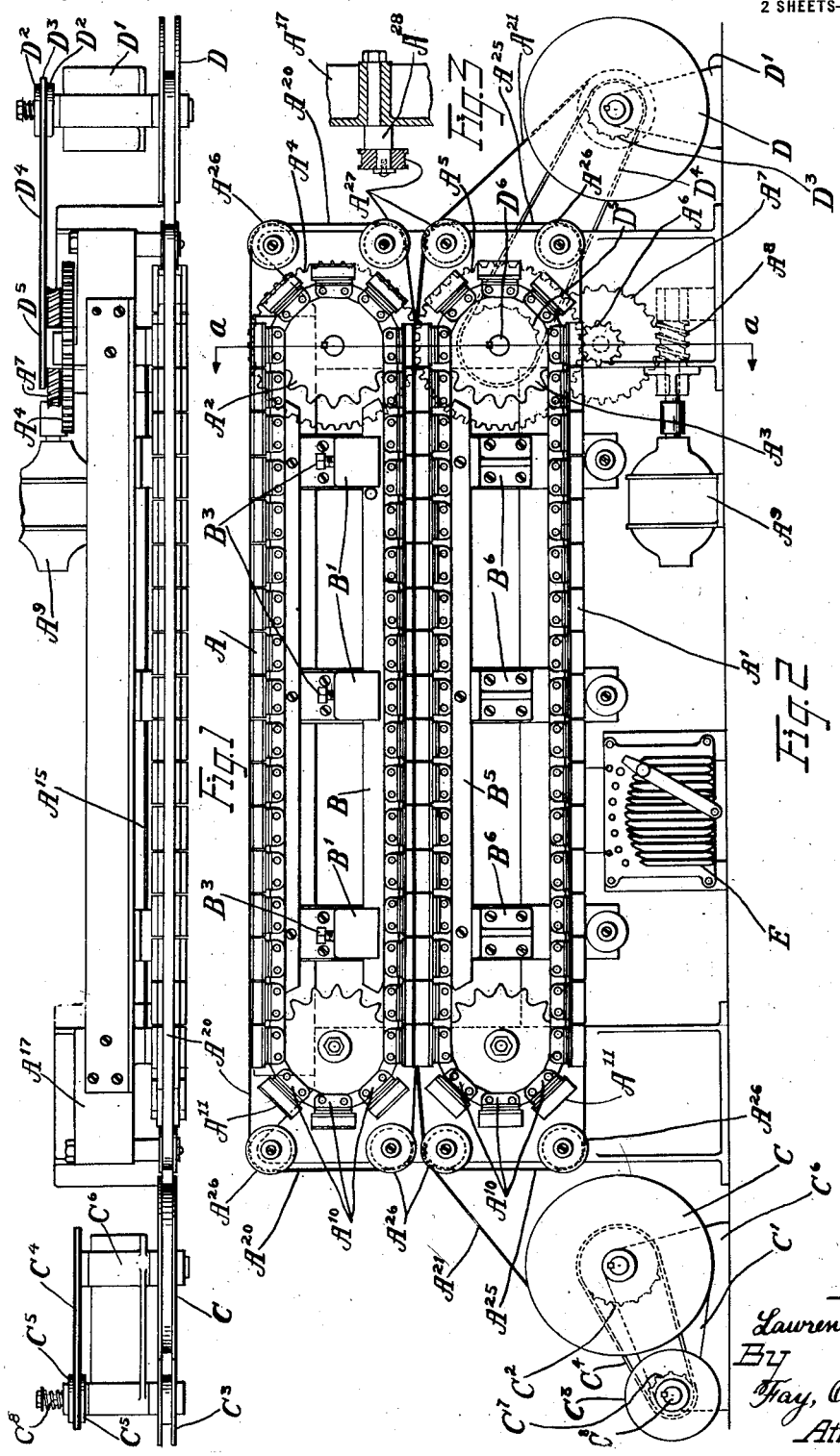
Inventor
Lawrence A. Subers
By
Fay, Oberlin & Fay
Attorneys

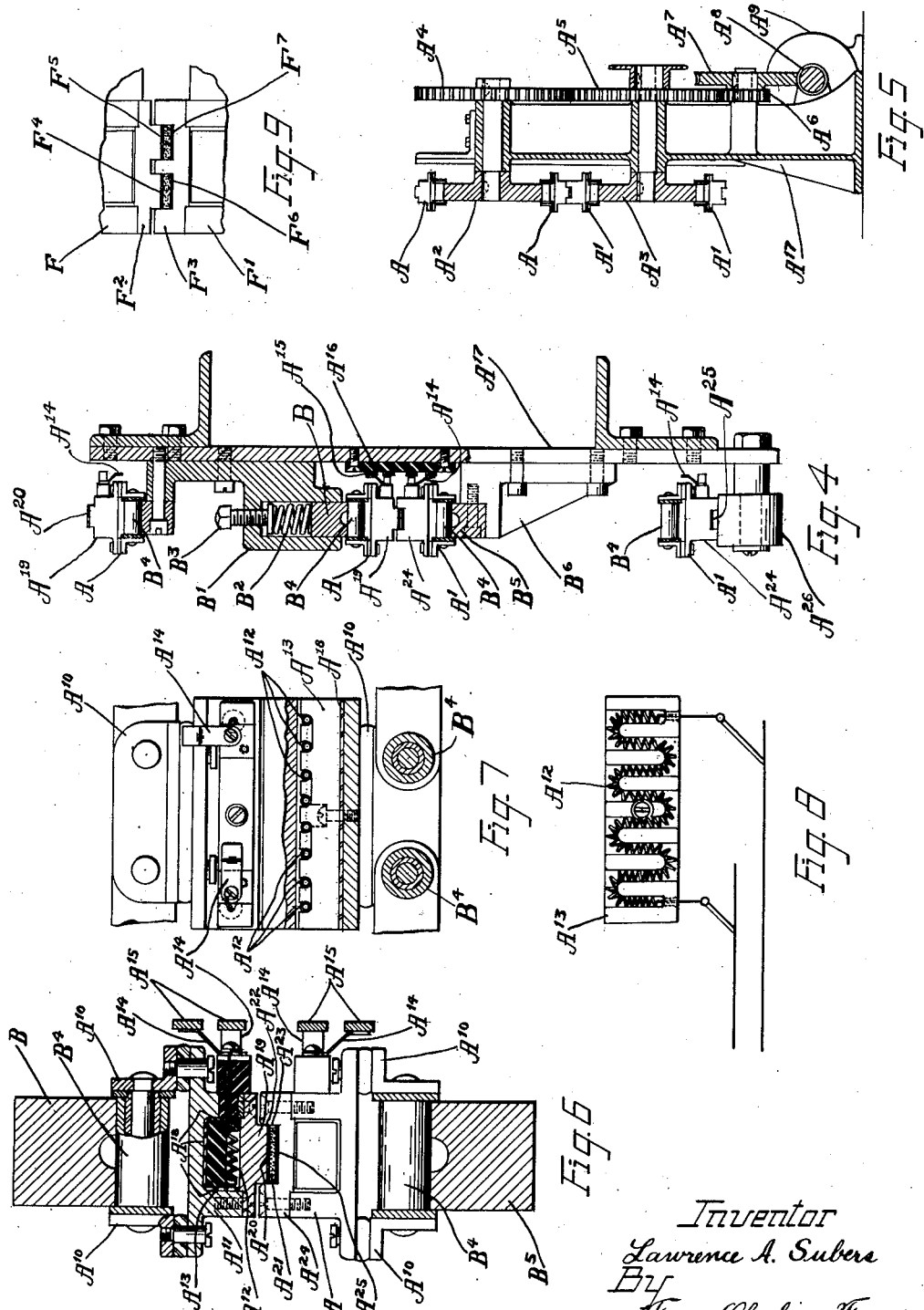

UNITED STATES PATENT OFFICE.

LAWRENCE A. SUBERS, OF LAKEWOOD, OHIO.

MACHINE FOR THE CONTINUOUS VULCANIZATION OF BANDS OR BELTS.

1,391,805.  Specification of Letters Patent.  Patented Sept. 27, 1921.

Application filed December 13, 1920. Serial No. 430,442.

*To all whom it may concern:*

Be it known that I, LAWRENCE A. SUBERS, a citizen of the United States, and a resident of Lakewood, county of Cuyahoga, and State of Ohio, have invented a new and useful Improvement in Machines for the Continuous Vulcanization of Bands or Belts, of which the following is a specification, the principle of the invention being herein explained and the best mode in which I have contemplated applying that principle, so as to distinguish it from other inventions.

The present invention relates to a machine adapted to either continuously vulcanize a band or belt of any length, properly treated with rubber, the necessary heat and pressure being applied according to the nature of the article and the chemical nature of the rubber compound, or to apply continuous treatment by heat or pressure or both to any desired material with or without adhesive.

Provision is made for the storage of the material both before and after treatment and other means for conveying the band and for holding the band between smooth unbroken metal surfaces, while heat and pressure are supplied, as well as for confining the edges of the band during the process.

To the accomplishment of the foregoing and related ends, said invention then, consists of the means hereinafter fully described and particularly pointed out in the claims.

The annexed drawings and the following description set forth in detail certain mechanism embodying the invention, such disclosed means constituting however, but one of various mechanical forms in which the principle of the invention may be used.

In said annexed drawings:—

Figure 1 is a plan view of the machine; Fig. 2 is a side view of the machine; Fig. 3 is a partial sectional view of one guide spool eccentrically adjustable to take up any slack in the metallic band; Fig. 4 is a vertical section of the band conveying mechanism shown in Fig. 2; Fig. 5 is a vertical section of the machine on line a—a Fig. 2; Fig. 6 is an enlarged vertical sectional view of the heating units in the conveying mechanism; Fig. 7 is a side vew of the same; Fig. 8 is an enlarged plan view of the electrical heating coil and insulation used on the chains; Fig. 9 shows a portion of a modified form of conveying mechanism wherein two bands may be conveyed and vulcanized or treated simultaneously.

The machine as illustrated is provided with a main frame $A^{17}$, a motor $A^9$ being suitably mounted and being provided with a driving worm $A^8$. In one end of the frame are mounted upper and lower sprocket wheels $A^2$ and $A^3$, operated through a train of gears $A^4$, $A^5$, $A^6$ and a worm wheel $A^7$ from the driving worm. Mounted in the other end of the machine are two similar idler sprocket wheels $A^2$ and $A^3$, these sprocket wheels carrying upper and lower sprocket chains A and $A^1$, which act as conveyer means for the bands to be vulcanized.

These chains are made up of special links $A^{10}$ carrying hollow blocks $A^{11}$ in which are mounted heating coils $A^{12}$ with insulation $A^{13}$ as clearly shown in detail in Fig. 8. These heating coils are connected through brushes $A^{14}$ to contact bars $A^{15}$ mounted on the main frame $A^{17}$ of the machine but provided with insulation $A^{16}$. The bars $A^{15}$ are connected to any suitable source of current supply through a controller or rheostat E whereby the current through the bars and coils may be regulated to give any desired heating effect.

Each special link $A^{10}$ is provided with an open face to which is attached a heating shoe $A^{19}$, the heating coil and insulation therefor being inclosed by asbestos $A^{18}$ or other suitable material on three sides but being left open on the side toward the shoe to allow the heat to be transmitted on the open side through the shoe. The shoes for the upper chain are provided with projecting contact portions $A^{22}$ which fit into complementary slots $A^{23}$ in the shoes $A^{24}$ on the lower chain so as to confine the edges of the belt during vulcanization and prevent the flow of the softened rubber.

Between these chains and shoes are mounted two continuous metal liners $A^{20}$ which are carried and guided by rolls $A^{26}$ and $A^{27}$ rotatably mounted in the frame of the machine. One of the rolls $A^{27}$ for each liner is carried on an eccentric shaft $A^{28}$ so that by rotating the shaft the roller may be moved to take up any slack developing in the liners. The liners are preferably coated so as to prevent them from sticking to the material being treated and soap tree bark solution, soap stone or other similar material may be used to treat or coat the liners.

Means are provided for exerting pressure on the belts and liners, these means comprising a pressure bar B mounted in guiding brackets $B^1$ so as to bear on the chains. To vary the tension compression springs $B^2$ and compression screws $B^3$ are employed to force the bar against the chain. The power loss is small due to the bar acting against the rollers $B^4$ of the chain giving a rolling contact.

The band or material to be treated or vulcanized is stored on a spool or roll C together with a liner $C^1$ of holland cloth or other suitable material. This spool is removably mounted in a bracket $C^6$ in alinement with the chains and liners.

The band is fed in between the liners which are under sufficient pressure from the chains to grip the band and move the same with themselves and the chains through the machine. As this band is pulled through the machine the roll C is rotated, driving a take up spool $C^3$ for the holland cloth $C^1$ through sprockets $C^2$ and $C^7$ on the roll shaft and the shaft $C^8$ of the take up spool by means of a drive chain $C^4$. The sprocket $C^7$ is adapted to drive the shaft $C^8$ through the spring pressed friction plates $C^5$ secured to the shaft as clearly indicated in Fig. 1.

As the band $A^{21}$ is drawn through the machine by the chains A and $A^1$ the heat and pressure during its passage produces the result desired and it is then stored upon the spool D, mounted in the bracket $D^1$ and driven by the spring pressed friction plates $D^2$ on the spool shaft $D^7$, the sprocket $D^3$ rotatably mounted thereon, the chain $D^4$ and sprocket wheel $D^5$ on the shaft $D^6$ of gear $A^5$.

The object of the metallic belts or liners $A^{20}$ and $A^{25}$ is to provide a smooth unbroken surface to the top and bottom of the band or material during treatment, as the rubber or adhesive may soften during the process and any break or joint would show on the surface of the finished article.

The length of the machine and the speed at which the chains A and $A^1$ travel are such as to give the necessary time required for treatment, the heat and pressure being also regulated according to the chemical nature of the substance used.

A modified form of chains F and $F^1$ are shown in Fig. 9 where different heating shoes $F^2$ and $F^3$ are used, two bands being carried at once with accompanying metallic liners $F^4$, $F^5$, $F^6$ and $F^7$, thereby enabling double the amount of product to be treated at once.

It is obvious that a series of chains may be arranged one over the other in a vertical plane, with the adjoining portions thereof moving in the same direction and at the same speed, with similar operating mechanism as previously described, the lower portion of the top or first chain and the upper portion of the next or second chain treating material introduced between, while the lower part of the second chain and upper part of the third chain may also treat a second band of material which would travel in the opposite direction through the machine, while the lower part of the third chain and upper part of a fourth chain may treat a third band of material, which would progress through the machine in the same direction as the first band of material and so on as described, without departing from the spirit of the invention or the scope of the claims.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine for continuously applying heat and pressure to material passing therethrough, the combination of complementary conveyer chains adapted to receive the material to be treated, means for moving said chains in the same direction and at the same speed, means for continuously heating said chains, and means for pressing said chains yieldingly together to compress and heat the material between said chains during movement of the latter.

2. In a machine for continuously applying heat and pressure to material passing therethrough, the combination of complementary conveyer chains adapted to receive the material to be treated, means for moving said chains in the same direction and at the same speed, heating blocks mounted on said chains, and means for pressing said chains together on the material to be treated to apply heat and pressure to such material between said chains during movement of the latter.

3. In a machine for continuously applying heat and pressure to material passing therethrough, the combination of complementary conveyer chains adapted to receive the material to be treated, means for moving said chains in the same direction and at the same speed, blocks with heating coils, mounted on said chains, and means for varying the heating effect of said coils and blocks, and means for pressing said chains together during movement to apply the heat and pressure to the material between said chains.

4. In a machine for continuously applying heat and pressure to material passing therethrough, the combination of complementary conveyer chains, means for moving said chains through the machine in the same direction and at the same speed, blocks provided with heating coils attached to said chains, metallic liners surrounding said chains passing therebetween and moving therewith, said liners being adapted to receive the material to be treated and to furnish a continuous bearing surface for such material, said heating blocks being adapted to heat such liners, and means for pressing said chains and liners together to provide the necessary pressure on the material to be treated.

5. In a machine for continuously applying heat and pressure to material passing therethrough, the combination of complementary conveyer chains provided with heating blocks, the blocks on one chain having projecting portions, the blocks on the complementary chain having complementary formed slots to receive such projections, means for moving said chains in the same direction and at the same speed and means for pressing said chains yieldingly together on the material to be treated to apply heat and pressure to such material between said chains during movement of the latter.

6. In a machine for continuously applying heat and pressure to material passing therethrough, the combination of conveyer chains having heating blocks mounted thereon, means for driving said chains in the same direction and at the same speed, metallic liners surrounding said chains and furnishing a continuous bearing surface for material introduced therebetween, and means for applying yielding pressure upon said chains to compress the material between said belts or liners, thereby holding and carrying the material through the machine.

7. In a machine for continuously applying heat and pressure to material passing therethrough, the combination of complementary conveyer chains provided with heating blocks, means for driving said chains in the same direction and at the same speed, metallic liners surrounding said chains but spaced away therefrom except for the portions of the chains in contact, said liners being adapted to furnish a continuous bearing surface for the material to be treated, means for keeping said liners under uniform tension, and other means for yieldingly applying pressure upon said chains to compress the material between said liners, thereby holding and carrying the material through the machine.

8. In a machine for continuously applying heat and pressure to material passing therethrough, the combination of complementary conveyer chains provided with heating blocks, the blocks upon one chain being provided with projecting portions, the blocks on the complementary chain having complementary formed slots to receive such projections, the sides of the slots forming confining means for the material to be treated, metallic liners surrounding said chains and being adapted to be received in such slots in said blocks, said liners being adapted to receive the material to be treated and to furnish a continuous bearing surface for the same, means for driving said chains and liners, and means for pressing said chains and liners together to compress the material being treated and to hold the material between such liners and carry the material through the machine.

9. In a machine for continuously applying heat to material passing therethrough, the combination of complementary conveyer chains, blocks mounted on said chains, conductor bars mounted along said chains but insulated therefrom, heating coils mounted in said blocks and provided with brushes adapted to have sliding contact with said bars, means for regulating current in said bars and thus the heating effect in said coils, continuous metal liners mounted between said blocks and moving therewith, said liners being adapted to be heated by said blocks and to receive therebetween the material to be treated, means for moving said chains and liners and thereby the material therebetween, and means for pressing said chains and liners together to compress the material during heating.

10. In a machine for continuously applying heat and pressure to material to be treated, the combination of a frame, two complementary conveyer chains mounted therein, heating blocks mounted on said chains, blocks on one chain having projecting portions, blocks on the other chain having complementary slots, rolls mounted on said frame, metal liners mounted on said rolls and surrounding said chains, said liners being adapted to be received in such slots, means to drive said liners and said chains in the same direction and at the same speed, and means for applying a yielding pressure on said chains to compress the material and to hold and carry the material through the machine.

Signed by me, this 14th day of October, 1920.

LAWRENCE A. SUBERS.